(12) United States Patent
Scott et al.

(10) Patent No.: US 8,523,222 B2
(45) Date of Patent: Sep. 3, 2013

(54) CURTAIN AIRBAG ASSEMBLY FOR A MOTOR VEHICLE

(75) Inventors: Timothy Scott, Benfleet (GB); Michal Jan Swiniarski, Brentwood (GB); Barry Grindle, Saffron Walden (GB); Jamel E. Belwafa, Ann Arbor, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/312,214

(22) Filed: Dec. 6, 2011

(65) Prior Publication Data

US 2012/0139216 A1 Jun. 7, 2012

(30) Foreign Application Priority Data

Dec. 6, 2010 (GB) .................................. 1020629.0
Jun. 22, 2011 (GB) .................................. 1110582.2

(51) Int. Cl.
*B60R 21/232* (2011.01)
*B60R 21/233* (2006.01)
*B60R 21/262* (2011.01)

(52) U.S. Cl.
USPC .................... 280/730.2; 280/740; 280/742

(58) Field of Classification Search
USPC ...................................... 280/730.2, 740, 742
See application file for complete search history.

(56) References Cited

U.S. PATENT DOCUMENTS

| 6,378,895 B1 | 4/2002 | Brucker et al. |
| 2003/0111829 A1 | 6/2003 | Tesch |

FOREIGN PATENT DOCUMENTS

| DE | 4231522 A1 | 3/1994 |
| GB | 1349097 | 3/1974 |

OTHER PUBLICATIONS

Great Britain Intellectual Property Office, Search Report for the corresponding GB Patent Application No. GB1020629.0 mailed Mar. 23, 2011.
Great Britain Intellectual Property Office, Search Report for the corresponding GB Patent Application No. GB1110582.2 mailed Oct. 5, 2011.

*Primary Examiner* — Ruth Ilan
(74) *Attorney, Agent, or Firm* — Frank A. MacKenzie; Brooks Kushman P.C.

(57) ABSTRACT

An airbag assembly for a motor vehicle includes an inflator and a curtain airbag securable to a body structure of the motor vehicle. The airbag includes two or more deployment tubes and two or more inflatable chambers. Vents connect the deployment chambers with the inflatable chambers. Gasses from the inflator pass first into the deployment tubes to rapidly inflate them to vertically extending positions and draw the airbag over a window opening. The gasses then pass through the vents into the inflatable chambers to complete the deployment of the curtain airbag. The rapid inflation and deployment of the deployment chambers provides cushioning for an occupant's head early in a crash event, followed by the inflation of the inflatable chambers to provide additional head protection and increasing the resistance of the curtain airbag to ejection through the underlying window apertures.

12 Claims, 3 Drawing Sheets

CURTAIN AIRBAG ASSEMBLY FOR A MOTOR VEHICLE

CROSS-REFERENCE TO RELATED APPLICATIONS

This application claims foreign priority benefits under 35 U.S.C. §119(a)-(d) to GB 1020629.0 filed Dec. 6, 2010 and to GB 1110582.2 filed Jun. 22, 2011, which are hereby incorporated by reference in their entirety.

TECHNICAL FIELD

This invention relates to curtain airbag assemblies used for occupant protection in motor vehicles.

BACKGROUND

It is well known to provide a motor vehicle with a curtain airbag to protect an occupant of the motor vehicle from injury during an accident.

To achieve rapid inflation of such curtain airbags, a very large inflator may be required. Such large inflators are difficult to package on a vehicle and are so undesirable. Furthermore the curtain airbag is easily distorted during inflation and so it is possible for it to be pushed out through the window aperture if impacted against before full operating pressure is reached within the airbag.

SUMMARY

According to a first disclosed embodiment, a curtain airbag for occupant protection in a motor vehicle has an upper edge securable to a body structure of the motor vehicle and comprises at least one deployment tube receiving gasses from an inflator; at least one inflatable chamber; and a vent opening connecting the deployment tube(s) with the inflatable chamber(s) and through which the gasses flow from the deployment tube(s) into the inflatable chamber(s) during deployment of the curtain airbag.

Each deployment tube may extend substantially vertically down from the upper edge of the curtain airbag when the curtain airbag is fully deployed.

Each deployment tube may extend from the upper edge of the curtain airbag towards a lower edge of the curtain airbag for substantially the entire length of the curtain airbag.

The total volume of the deployment tubes may be relatively small compared to the combined total volume of the deployment tubes and the inflatable chambers, thereby reducing the time required to deploy the curtain airbag.

At least one deployment tube may include one or more vents for supplying gas to at least one inflatable chamber.

The one or more vents may supply gas to a bottom end of the at least one inflatable chamber.

Each inflator may be connected to the curtain airbag via a manifold having a separate output for each deployment tube.

According to an embodiment, an airbag assembly for a motor vehicle comprises an inflator and a curtain airbag. The curtain airbag has an upper edge securable to a body structure of the motor vehicle, at least one deployment tube receiving gasses from the inflator, at least one inflatable chamber, and vents connecting the deployment chambers with the inflatable chambers. The gasses from the inflator pass first into the deployment tubes to inflate them to their vertically extending positions, then pass through the vents into the inflatable chambers to complete the deployment of the curtain airbag.

According to an embodiment, the curtain airbag may have two inflatable chambers and each of the chambers may be bounded on both sides by a respective deployment tube, an inflator has a manifold with a first outlet for supplying gas to a first deployment tube located at one end of the airbag, a second outlet for supplying gas to a second deployment tube located at an opposite end of the airbag, a third outlet for supplying gas to a third deployment tube located between the two inflatable chambers, a fourth outlet tube for supplying gas to one of the two inflatable chambers and a fifth outlet for supplying gas to the other of the two inflatable chambers.

According to an embodiment the assembly may have a first inflator for providing gas to first and second deployment tubes, a second inflator for supplying gas to third, fourth and fifth deployment tubes and each of the deployment tubes may be partially surrounded by a respective inflatable chamber.

In an embodiment, each inflatable chamber may be shaped so as to form a number of fingers that interleave with the fingers on the adjacent inflatable chamber when the inflatable chambers are inflated.

Each of the deployment tubes may be shaped so as to provide a large head protection area and a small inflation volume.

BRIEF DESCRIPTION OF THE DRAWINGS

The invention will now be described by way of example with reference to the accompanying drawing of which:—

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
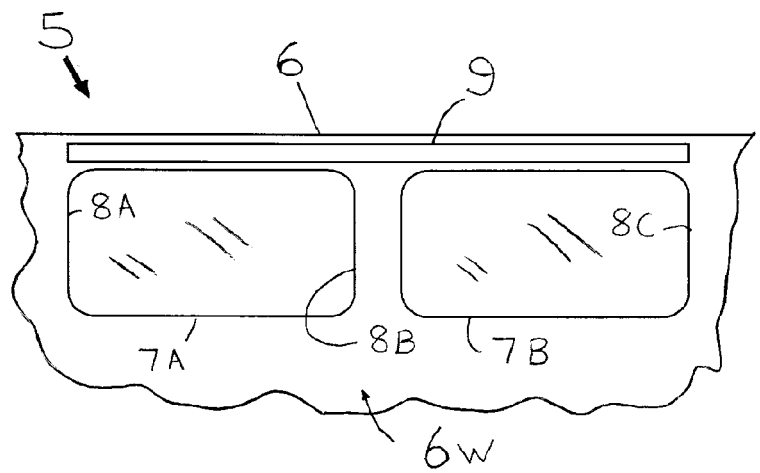
FIG. 1 is a partial side view of a right hand side of a motor vehicle having a curtain airbag assembly according to a first embodiment of the invention showing the airbag assembly in a stowed state prior to deployment.
Figure 2:
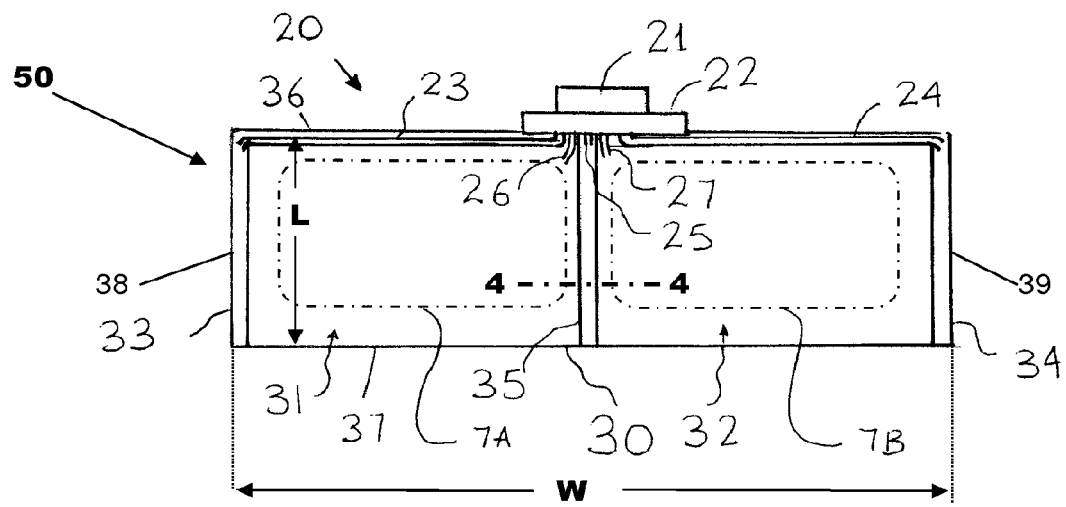
FIG. 2 is a view similar to FIG. 1 but showing an airbag forming part of the airbag assembly in a deployed state.
Figure 3:
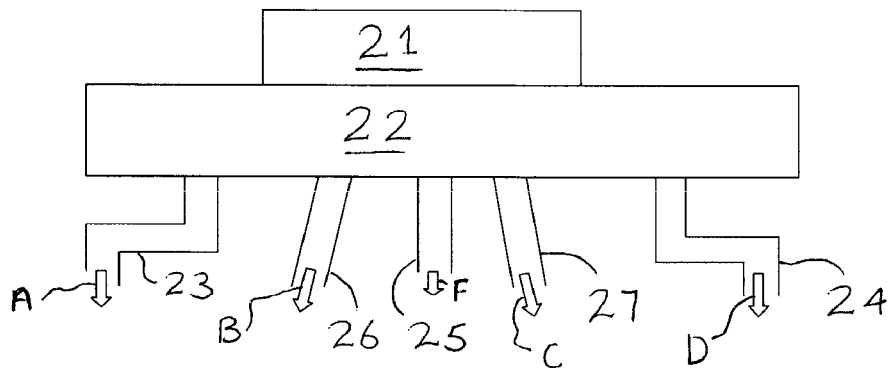
FIG. 3 is an enlarged view of an inflator and manifold forming part of the airbag assembly.

With reference to FIG. 1 there is shown part of the right hand side of a motor vehicle 5 as viewed from a passenger compartment of the motor vehicle 5. The motor vehicle 5 has a body structure 6 including a side wall 6W having three structural members in the form of an A-post 8A, a B-post 8B and a C-post 8C. The side wall 6W has two window apertures 7A and 7B formed therein. A storage compartment 9 for a curtain airbag 30 is disposed at the top of the side wall 6W for stowing the curtain airbag 30 prior to deployment.

Referring now to FIGS. 2 to 5 a curtain airbag assembly 50 includes the curtain airbag 30. The curtain airbag 30 has an upper edge 36, a lower edge 37, a front edge 38 and a rear edge 39. When deployed the curtain airbag 30 has a width "W" and a length "L" (as shown on FIG. 2).

Figure 4:
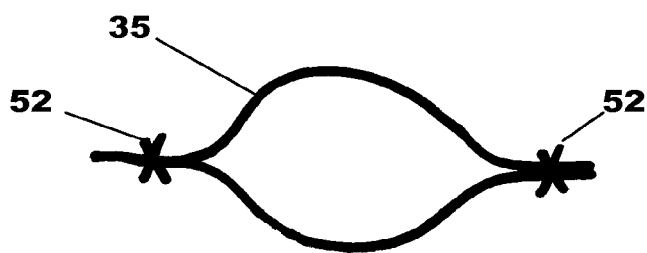
FIG. 4 is a scrap cross-section along the line 4-4 on FIG. 2 through a deployment tube forming part of the airbag showing the deployment tube in a fully inflated condition.

The curtain airbag 30 includes first and second inflatable chambers 31, 32 and first, second and third deployment tubes 33, 34 and 35. The deployment tubes 33, 34, 35 are formed as an integral part of the curtain airbag 30 and are defined by columns of stitching 52 that sealingly separate the deployment tubes 33, 34, 35 from the inflatable chambers 31, 32. FIG. 4 shows two columns of stitching 52 defining the third deployment tube 35.

Each of the inflatable deployment tubes 33, 34, 35 is of a small internal volume compared to the two inflatable chambers 31, 32. In one example, the volume of each of the deployment tubes 33, 34, 35 was 2% of the volume of the inflatable chamber 31 and the inflatable chamber 32 was of substantially the same volume as the inflatable chamber 31.

It will however be appreciated that in other embodiments the two inflatable chambers 31, 32 could be of differing volume or there could be more or less than two inflatable chambers. However, in all cases, the volume of each deployment tube 33, 34, 35 is considerably smaller than any of the inflatable chambers of the curtain airbag thereby permitting it to be rapidly inflated during deployment of the curtain airbag 30.

Each of the deployment tubes 33, 34, 35 extends for substantially the entire vertical length of the curtain airbag 30. Each of the deployment tubes 33, 34, 35 extends when the curtain airbag 30 is deployed substantially vertically from a position close to the upper edge 36 of the curtain airbag 30 to a position close to the lower edge 37 of the curtain airbag 30.

An inflator 21 is provided as part of the airbag assembly 50 to inflate the curtain airbag 30 so as to deploy it. The inflator 21 is controlled by an electronic controller (not shown) in accordance with parameters stored in the controller and inputs received by the controller from sensors (not shown) located on the motor vehicle 5 as is well known in the art.

The inflator 21 is connected to a manifold 22 having a number of small cross-sectional area outlets 23, 24, 25, 26 and 27. Because of the very high pressure developed in the inflator 21, the flow rate from the outlets 23, 24, 25, 26 and 27 is sufficient to produce the desired inflation, yet when the curtain airbag 30 is collapsing following the exhaustion of the inflator 21 the small cross-section area provides a significant resistance to flow of the relatively low pressure gas of (approx 1.0 Bar) from the inflatable chambers 31, 32. The provision of the small cross-sectional area outlets therefore acts as a virtual two-way valve allowing flow into the chambers during inflation yet restricting flow out of the chambers during deflation. The outlets 23, 24, 25, 26 and 27 are connected to the two inflatable chambers 31, 32 and to the three deployment tubes 33, 34, 35 in the following manner.

The outlet 23 is connected to the first deployment tube 33 located near to the front edge 38 of the curtain airbag 30 and is arranged to provide a gas flow "A" (see FIG. 3) to the respective deployment tube 33 when the curtain airbag 30 is being deployed.

The outlet 24 is connected to the second deployment tube 34 located near to the rear edge 39 of the curtain airbag 30 and is arranged to provide a gas flow "D" to the respective deployment tube 33 when the curtain airbag 30 is being deployed.

The outlet 25 is connected to the third deployment tube 35 located between the two inflatable chambers 31, 32 and is arranged to provide a gas flow "F" to the respective deployment tube 35 when the curtain airbag 30 is being deployed.

The outlet 26 is connected to the first inflatable chamber 31 located towards the front of the curtain airbag 30 and is arranged to provide a gas flow "B" to the first chamber 31 when the curtain airbag 30 is being deployed.

The outlet 27 is connected to the second inflatable chamber 32 located towards the rear of the curtain airbag 30 and is arranged to provide a gas flow "C" to the second inflatable chamber 32 when the curtain airbag 30 is being deployed.

The cross-sectional area of the outlets 23 to 27 could be identical or they could of differing cross-sectional area so as to provide differing flow rates "A" to "F".

Figure 5:
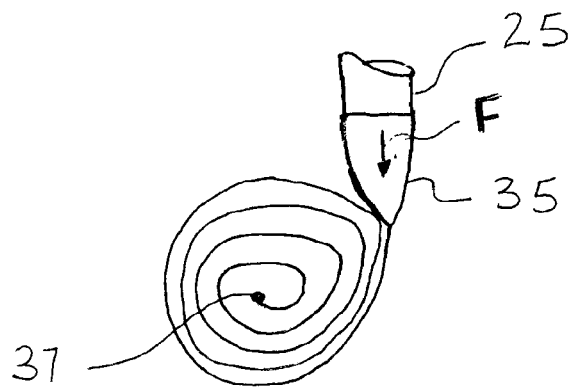
FIG. 5 is a scrap side view of the high pressure deployment tube shown in FIG. 4 at the commencement of inflation.

In FIG. 5 the curtain airbag 30 is showed in a rolled up stowed state just after inflation has commenced and the third deployment tube 35 is beginning to inflate. It will be appreciate that the curtain airbag 30 could be folded rather than being rolled up in its stowed state.

Operation of the airbag assembly is as follows: When the inflator 21 receives a command to inflate the curtain airbag 30 it begins to produce gas that flows into the manifold 22 and then out via the outlets 26, 27; 23, 24, 25 to the inflatable chambers 31, 32 and to the deployment tubes 33, 34, 35 respectively. Because the deployment tubes 33, 34, 35 are of a relatively small volume the initial gas flow will rapidly inflate them, causing them to straighten from their stowed positions thereby pulling the rest of the curtain airbag 30 into position before the inflation of the inflatable chambers 31, 32 has completed. The gas continues to flow thereby inflating the inflatable chambers 31, 32 which have been correctly prepositioned by the deployment tubes 33, 34, 35 to overlie the window apertures 7A, 7B.

Therefore, unlike a conventional curtain airbag, the time taken to locate the curtain airbag 30 in position is not determined by the time taken to fill the relatively large volume inflatable chambers 31, 32, but rather is dictated by the time taken to inflate the deployment tubes 33, 34, 35 which assist the deployment of the curtain airbag 30 by rapidly pulling it into position as they unfold.

One advantage of the invention is that a smaller inflator can be used compared to a conventional curtain airbag because the filling time of the two inflatable chambers 31, 32 does not determine the time taken to position the curtain airbag 30 unlike a conventional curtain airbag.

A further advantage can be obtained if the pressure in the deployment tubes 33, 34, is arranged to remain high during the time period that the curtain airbag 30 is deployed. In such a case, the deployment tubes 33, 34, 35 act as stiffening members that can prevent undue distortion of the curtain airbag 30 and reduce the possibility of part of the curtain airbag being extruded out through one of the window apertures 7A, 7B. The deployment tubes 33, 34, 35 therefore are able to stabilize the curtain airbag 30 and help to maintain it in position.

Another advantageous arrangement is to provide one or more vents in one or more of the deployment tubes 33, 34, 35. The vent or vents (not shown) are located near to the lower edge 37 of the curtain airbag 30. As the deployment tubes 33, 34, 35 approach their fully deployed positions the unfolding or unrolling of the material forming the deployment tubes 33, 34, 35 reveals or uncovers the vent or vents thereby allowing gas to flow from the respective deployment tube 33, 34, 35 into an adjacent inflatable chamber 31, 32. This has the effect of increasing the speed of filling of the inflatable chambers 31, 32 after the curtain airbag 30 has been positioned by the initial filling of the deployment tubes 33, 34, 35. Such an arrangement allows the inflatable chambers 31, 32 to be filled from the top via the manifold 22 and the outlets 26, 27 and from the bottom via one or more vents in one or more of the deployment tubes 33, 34, 35. This is advantageous in that it is normally difficult to produce rapid inflation of the bottom of a curtain airbag and yet, in some cases, this is where initial contact of an occupant may occur.

Although as described above the curtain airbag has two inflatable chambers it will be appreciated that it can be advantageously applied to curtain airbags having a different number of inflatable chambers.

Figure 6:
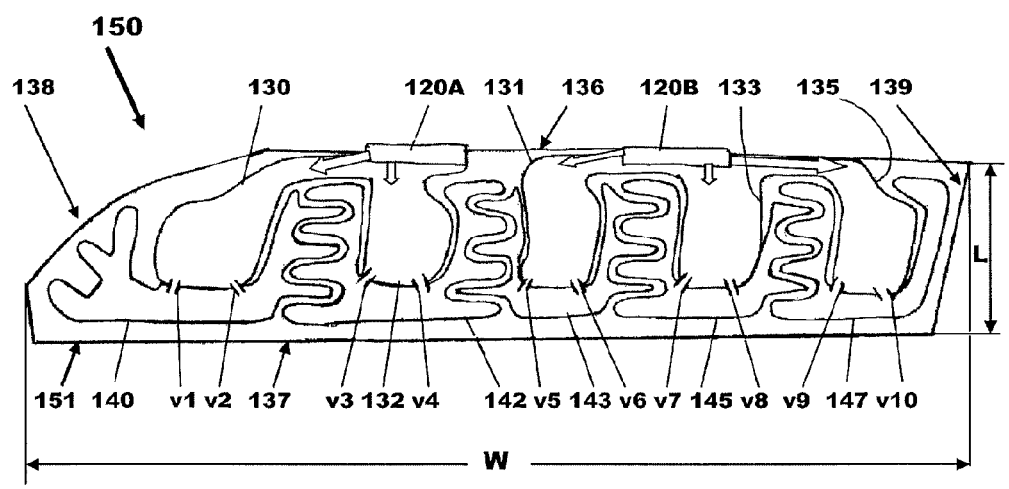
FIG. 6 is a side view of a curtain airbag assembly according to a second embodiment of the invention showing the airbag curtain in a deployed state.

Referring now to FIG. 6 there is shown a second embodiment of a curtain airbag assembly 150 comprising a curtain airbag 151 and two inflators 120A, 120B.

The curtain airbag 151 has an upper edge 136, a lower edge 137, a front edge 138 and a rear edge 139. When deployed the curtain airbag 151 has a width "W" and a length "L" (as indicated on FIG. 6).

The curtain airbag 151 includes first, second, third, fourth and fifth inflatable chambers 140, 142, 143, 145 and 147 respectively and first, second, third, fourth and fifth deployment tubes 130, 132, 131, 133 and 135 respectively.

The deployment tubes 130, 132, 131, 133 and 135 are formed as an integral part of the curtain airbag 151 and are defined by stitching that sealingly separate the deployment tubes 130, 132, 131, 133, and 135 from the inflatable chambers 140, 142, 143, 145 and 147.

Each of the inflatable deployment tubes 130, 132, 131, 133 and 135 is of a relatively small internal volume so as to permit them to be rapidly inflated.

Each of the deployment tubes 130, 132, 131, 133 and 135 extends from a position close to the upper edge 136 of the curtain airbag 151 towards the lower edge 137 of the curtain airbag 151 in a lengthwise direction of the curtain airbag 151 and extends substantially vertically when the curtain airbag 151 is inflated.

The two separate inflators 120A and 120B are provided to inflate the curtain airbag 151 so as to deploy it. The inflators 120A, 120B are controlled by an electronic controller (not shown) in accordance with parameters stored in the controller and inputs received by the controller from sensors (not shown) located on the motor vehicle to which the curtain airbag 151 is fitted as is well known in the art.

The first inflator 120A is connected via a manifold (not shown) to two outlets (indicated by arrows on FIG. 6).

The first of these outlets provides gas to the first deployment tube 130 and the other outlet provides gas to the second deployment tube 132. Each of the deployment tubes 130, 132 include one or more vents formed by weakened stitching. In the example shown in FIG. 6 the first deployment tube has two vents v1 and v2 and the second deployment tube 132 also has two vents v3 and v4 but it will be appreciated that there could be a different number of vents. The vents v1, v2; v3, v4 are located at a lower end of the respective deployment tube 130, 132 and are formed by the localized failure of the stitching forming the respective deployment tube 130, 132 when the pressure in the respective deployment tube 130, 132 reaches a certain predefined level. After the vents v1, v2; v3, v4 are formed gas can flow from the two deployment tubes 130, 132 into the two respective inflatable chambers 140, 142. That is to say, the first chamber 140 is filled by the gas flowing from the first deployment tube 130 via the vents v1 and v2 and the second chamber 142 is filled by the gas flowing from the second deployment tube 132 via the vents v3 and v4.

Each of the chambers 140, 142 is substantially U-shaped and partially envelopes the deployment tube 130, 132 from which it is filled. Each of the deployment tubes 130, 132 is shaped so as to provide a good area of head protection with minimum volume. In the example shown, the deployment tubes 130, 132 are wider near to the lower edge 137 of the curtain airbag 151 than they are near to the upper edge 136, as may be an appropriate design in the case where it is expected that the head of a passenger is more likely to contact the lower edge 137 than the upper edge 136 when the curtain airbag 151 is deployed.

As an alternative to the arrangement described above, one or more of the vents v1, v2; v3, v4 may be permanently open, but of a small area so as to form a choke or restriction to flow. In either case, the vents v1, v2, v3 and v4 ensure that the deployment tubes 130, 132 are rapidly deployed first to provide head protection and subsequently the first and second chambers 140, 142 fill to provide roll-over ejection protection.

The second inflator 120B is connected via a manifold (not shown) to three outlets (indicated by arrows on FIG. 6).

The first of these outlets provides gas to the third deployment tube 131, the second of these outlets provides gas to the fourth deployment tube 133 and the third outlet provides gas to the fifth deployment tube 135. Each of the deployment tubes 131, 133 and 135 includes one or more vents that may be formed by weakened stitching. In the example shown in FIG. 6, the third deployment tube 131 has two vents v5 and v6, the fourth deployment tube 133 has two vents v7, v8 and the fifth deployment tube 135 also has two vents v9 and v10, but it will be appreciated that there may be a different number of vents. The vents v5, v6; v7, v8 and v9, v10 are all located at a lower end of the respective deployment tube 131, 133, 135 and may be formed by the localized failure of the stitching forming the respective deployment tube 131, 133, 135 when the pressure in the respective deployment tube 131, 133, 135 reaches a certain predefined level.

After the vents v5, v6; v7, v8 and v9, v10 are formed, gas can flow from the deployment tubes 131, 133 and 135 into the respective enveloping chambers 143, 145 and 147. That is to say, the third chamber 143 is filled by the gas flowing from the third deployment tube 131 via the vents v5 and v6, the fourth chamber 145 is filled by the gas flowing from the fourth deployment tube 133 via the vents v7 and v8 and the fifth chamber 147 is filled by the gas flowing from the fifth deployment tube 135 via the vents v9 and v10.

One of more of the chambers 143, 145, 147 may be substantially U-shaped and partially envelope the deployment tube 131, 133, 135 from which it is filled. Each of the deployment tubes 131, 133, 135 is shaped so as to provide a good area of head protection with minimum volume. In the example shown, the deployment tubes 131, 135 are therefore wider near to the lower edge 137 of the curtain airbag 151 than they are near to the upper edge 136, as may be an appropriate design in the case where it is expected that the head of a passenger is more likely to contact the lower edge 137 than the upper edge 136 when the curtain airbag 151 is deployed.

As an alternative to the arrangement described above, one or more of the vents v5, v6; v7, v8 and v9, v10 may be permanently open, but of a small area so as to form a choke or restriction to flow. In either case, the vents v5, v6; v7, v8 and v9, v10 ensure that the deployment tubes 131, 133, 135 are rapidly deployed to provide head protection and then the third, fourth and fifth inflatable chambers 143, 145 and 147 fill to provide roll-over ejection protection.

It will be noted that the vertical edges of the respective chamber 140, 142, 143, 145 and 147 where they interact have a finger-like shape so that when the inflatable chambers 140, 142, 143, 145 and 147 are inflated the fingers are interleaved with one another. This arrangement may be advantageously used when the fingers are located so as to overlie the vertical structure of the motor vehicle (A, B, C, D etc. posts). In addition, the finger-like structure so formed locally stiffen the curtain airbag 151 and may provide increased resistance to localized ejection of the airbag curtain 151 through the underlying window aperture while reducing the volume of gas needed to provide this functionality.

The deployment tubes 130, 132, 131, 133, and 135 have the primary function of deploying the airbag curtain 151 rapidly so as to provide rapid head protection. For example, head cushioning can be provided in as little as 30 ms after initiation of the inflators 120A, 120B. This is achieved by using a relatively small gas volume for each of the deployment tubes 130, 132, 131, 133, and 135. Each of the deployment tubes 130, 132, 131, 133, and 135 is shaped so as to provide a large head protection area and a small inflation volume.

Then, after providing the initial deployment and head protection functions, the deployment tubes 130, 132, 131, 133, and 135 are used to fill the inflatable chambers 140, 142, 143, 145 and 147 whose primary function is to provide increased resistance to ejection of the curtain airbag 151 along with further head impact protection coverage.

It will be appreciated that if the size of the deployment tubes 130, 132, 131, 133 and 135 was increased to cover all of the area covered by the combination of the deployment tubes 130, 132, 131, 133 and 135 and the inflatable chambers 140, 142, 143, 145 and 147 then the time taken to fill such a large volume would be much longer if the same size inflators are used. Slower filling is undesirable because less head impact protection is provided early in a crash event.

Operation of the airbag assembly 150 is as follows.

When a crash event required deployment of the curtain airbag 151 is detected, the two inflators 120A, 120B are energized and begin to produce gas which very rapidly inflates the five deployment tubes 130, 132, 131, 133 and 135 thereby deploying the curtain airbag 151 to a fully deployed state overlying the underlying window apertures and body structure so as to provide head protection early in the crash event. The pressure in deployment tubes 130, 132, 131, 133 and 135 then continues to rise until the predefined pressure at which the vents v1, v2, v3, v4, v5, v6, v7, v8, v9 and v10 open is reached at which point all of the vents v1, v2, v3, v4, v5, v6, v7, v8, v9 and v10 open so as to allow gas to flow into the surrounding inflatable chambers 140, 142, 143, 145 and 147 thereby providing additional head protection and increasing the resistance of the curtain airbag 151 to ejection through one or more of the underlying window apertures (not shown).

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention as set out in the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An airbag assembly for a motor vehicle comprising:
    an inflator;
    a curtain airbag having an upper edge securable to a body structure of the motor vehicle, a first and a second inflatable chamber, a first deployment tube located at one end of the airbag and connected with the first inflatable chamber by a first vent, a second deployment tube located at an opposite end of the airbag and connected with the second inflatable chamber by a second vent, and a third deployment tube located between and bounding adjacent edges of the two inflatable chambers, the gasses flowing through the vents into the respective inflatable chambers during deployment of the curtain airbag; and
    a manifold connecting the inflator with the curtain airbag and having a first outlet supplying gas to the first deployment tube, a second outlet supplying gas to the second deployment tube, a third outlet supplying gas to the third deployment tube, a fourth outlet supplying gas to the first inflatable chamber, and a fifth outlet supplying gas to the second inflatable chamber.

2. The apparatus of claim 1 wherein at least one of the deployment tubes extends substantially vertically down from the upper edge of the curtain airbag when the curtain airbag is fully deployed.

3. The apparatus of claim 1 wherein at least one of the deployment tubes extends between the upper edge of the curtain airbag and a lower edge of the curtain airbag.

4. The apparatus of claim 1 wherein a total volume of the deployment tubes is relatively small compared to a combined total volume of the deployment tubes and the inflatable chambers.

5. The apparatus of claim 1 wherein at least one of the vents communicates with its respective inflatable chamber at a location adjacent to a bottom portion of the chamber.

6. The apparatus of claim 1 wherein at least one of the manifold outlets supplies gas to an upper end of its respective inflatable chamber.

7. An airbag assembly for a motor vehicle comprising:
    a curtain airbag having an upper edge securable to a body structure of the motor vehicle, five inflatable chambers, and five deployment tubes partially surrounded by each of the respective inflatable chambers and connected therewith by a vent;
    a first inflator supplying gases to a first and a second of the five deployment tubes; and
    a second inflator supplying gases to a third, a fourth, and a fifth of the five deployment tubes, the gasses supplied by the first and second inflators flowing through the respective vents into the respective inflatable chambers during deployment of the curtain airbag.

8. The apparatus of claim 7 wherein at least one of the deployment tubes extends substantially vertically down from the upper edge of the curtain airbag when the curtain airbag is fully deployed.

9. The apparatus of claim 7 wherein at least one of the deployment tubes extends between the upper edge of the curtain airbag and a lower edge of the curtain airbag.

10. The apparatus of claim 7 wherein a total volume of the deployment tubes is relatively small compared to a combined total volume of the deployment tubes and the inflatable chambers.

11. The apparatus of claim 7 wherein at least one of the vents communicates with its respective inflatable chamber at a location adjacent to a bottom portion of the chamber.

12. The apparatus of claim 7 wherein each inflatable chamber has a plurality of fingers that interleave with the fingers on the adjacent inflatable chamber when the inflatable chambers are inflated.

* * * * *